United States Patent
Mori et al.

(10) Patent No.: US 9,197,847 B2
(45) Date of Patent: *Nov. 24, 2015

(54) IMAGE DISPLAY DEVICE, IMAGE DISPLAY METHOD, AND PROGRAM

(71) Applicant: JOLED INC., Chiyoda-ku, Tokyo (JP)

(72) Inventors: Hideto Mori, Tokyo (JP); Yasuo Inoue, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,714

(22) Filed: Apr. 29, 2014

(65) Prior Publication Data

US 2014/0232935 A1    Aug. 21, 2014

Related U.S. Application Data

(63) Continuation of application No. 13/256,972, filed as application No. PCT/JP2010/059250 on Jun. 1, 2010, now Pat. No. 8,743,279.

(30) Foreign Application Priority Data

Jun. 16, 2009   (JP) .................................. 2009-143726

(51) Int. Cl.
   *H04N 7/01*     (2006.01)
   *G09G 5/00*     (2006.01)

(52) U.S. Cl.
   CPC ............... *H04N 7/0127* (2013.01); *G09G 5/00* (2013.01); *H04N 7/0132* (2013.01); *G09G 2310/063* (2013.01); *G09G 2320/0247* (2013.01); *G09G 2320/0252* (2013.01); *G09G 2320/0257* (2013.01); *G09G 2340/0435* (2013.01)

(58) Field of Classification Search
   USPC .................................................. 348/441, 459
   See application file for complete search history.

(56) References Cited

U.S. PATENT DOCUMENTS

| 5,844,617 | A  | 12/1998 | Faroudja et al. |
| 6,219,030 | B1 | 4/2001  | Nonomura et al. |
| 6,380,985 | B1 | 4/2002  | Callahan |
| 6,825,835 | B2 | 11/2004 | Sano et al. |
| 7,259,779 | B2 | 8/2007  | Avadanei et al. |

(Continued)

FOREIGN PATENT DOCUMENTS

| JP | 2002-6818   | 1/2002 |
| JP | 2002-215111 | 7/2002 |

(Continued)

OTHER PUBLICATIONS

Japanese Office Action issued Apr. 9, 2013 in Japanese Patent Application No. 2009-143726.

(Continued)

*Primary Examiner* — Brian Yenke
(74) *Attorney, Agent, or Firm* — Oblon, McClelland, Maier & Neustadt, L.L.P.

(57) ABSTRACT

An electronic device that generates a high frame rate video signal by increasing a frame rate of an input video signal; sets a non-emission frame at a predetermined cycle on the high frame rate video signal; extends an emission time of a frame directly before the frame set to non-emission into less than a full length of a field of the frame set to non-emission; and controls a display panel to display a video based on the setting and the extending.

7 Claims, 4 Drawing Sheets

(56) References Cited

U.S. PATENT DOCUMENTS

| | | | |
|---|---|---|---|
| 7,289,170 B2 * | 10/2007 | Jun | 348/790 |
| 7,636,099 B2 | 12/2009 | Shen et al. | |
| 7,656,374 B2 | 2/2010 | Shen et al. | |
| 7,817,127 B2 | 10/2010 | Take | |
| 7,821,481 B2 | 10/2010 | Take et al. | |
| 7,839,454 B2 * | 11/2010 | Rogers | 348/634 |
| 7,897,971 B2 | 3/2011 | Kurokawa et al. | |
| 8,228,427 B2 | 7/2012 | Mori et al. | |
| 8,284,318 B2 | 10/2012 | Sato et al. | |
| 2002/0015104 A1 | 2/2002 | Itoh et al. | |
| 2003/0179221 A1 | 9/2003 | Nitta et al. | |
| 2005/0141858 A1 | 6/2005 | Kumagai | |
| 2006/0267904 A1 | 11/2006 | Aiba | |
| 2007/0063961 A1 * | 3/2007 | Kuroki | 345/102 |
| 2007/0103418 A1 | 5/2007 | Ogino et al. | |
| 2007/0296876 A1 | 12/2007 | Terada | |
| 2008/0012791 A1 | 1/2008 | Ku | |
| 2008/0231579 A1 | 9/2008 | Vasquez et al. | |
| 2008/0238854 A1 | 10/2008 | Kimura | |
| 2009/0059068 A1 | 3/2009 | Hanaoka et al. | |
| 2009/0080789 A1 | 3/2009 | Shoji | |
| 2009/0179833 A1 * | 7/2009 | Honda | 345/76 |
| 2009/0256961 A1 | 10/2009 | Chen | |
| 2009/0310018 A1 | 12/2009 | Sakashita et al. | |
| 2012/0033042 A1 | 2/2012 | Mori et al. | |

FOREIGN PATENT DOCUMENTS

| | | |
|---|---|---|
| JP | 2004-233932 | 8/2004 |
| JP | 2004-253827 | 9/2004 |
| JP | 2007-133051 | 5/2007 |
| JP | 2007-316293 | 12/2007 |
| JP | 2009-58785 | 3/2009 |
| JP | 2009-300785 | 12/2009 |

OTHER PUBLICATIONS

European Search Report mailed Dec. 21, 2012 in European Application No. 10789362.

International Search Report issued Aug. 31, 2010 in PCT/JP10/059250 filed Jun. 1, 2010.

* cited by examiner

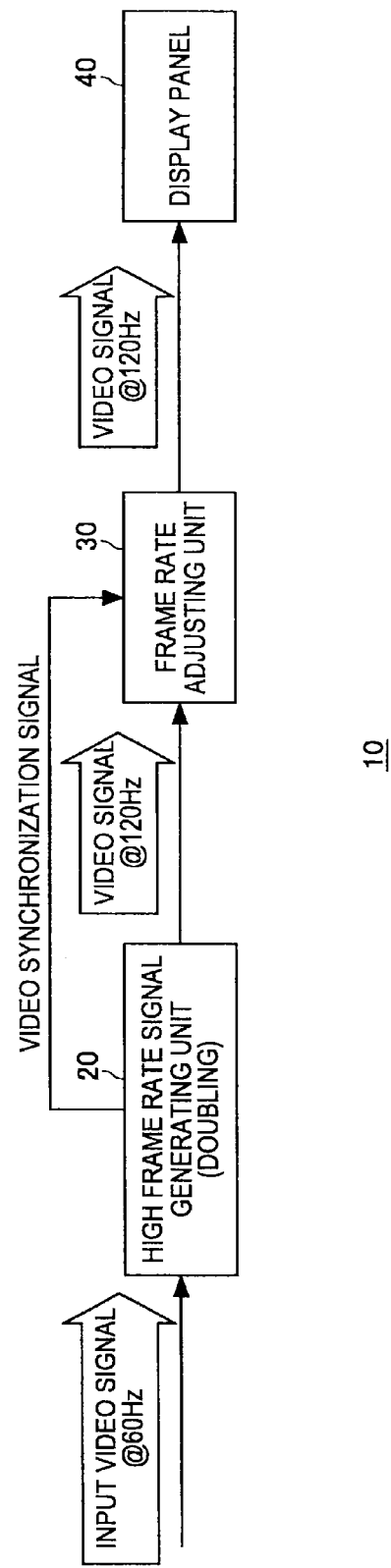

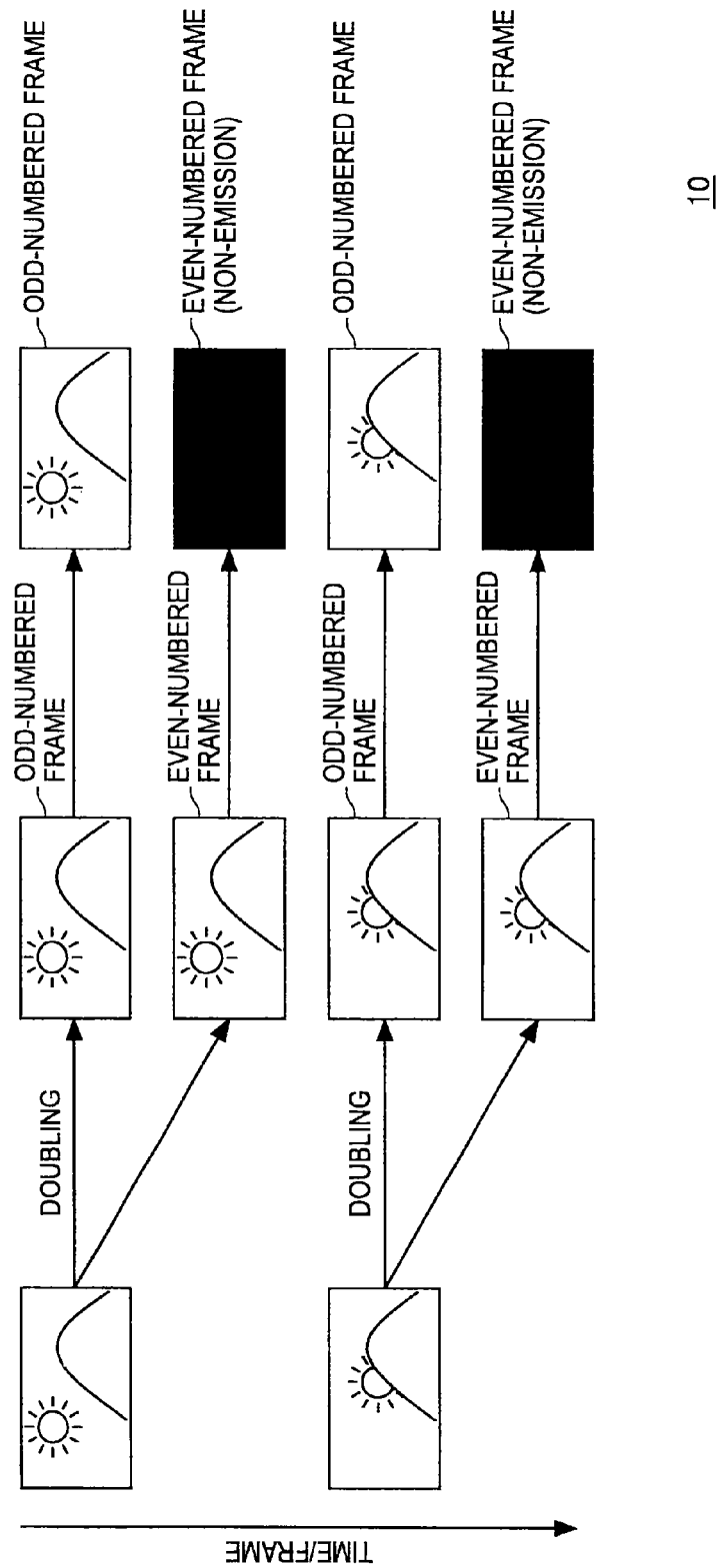

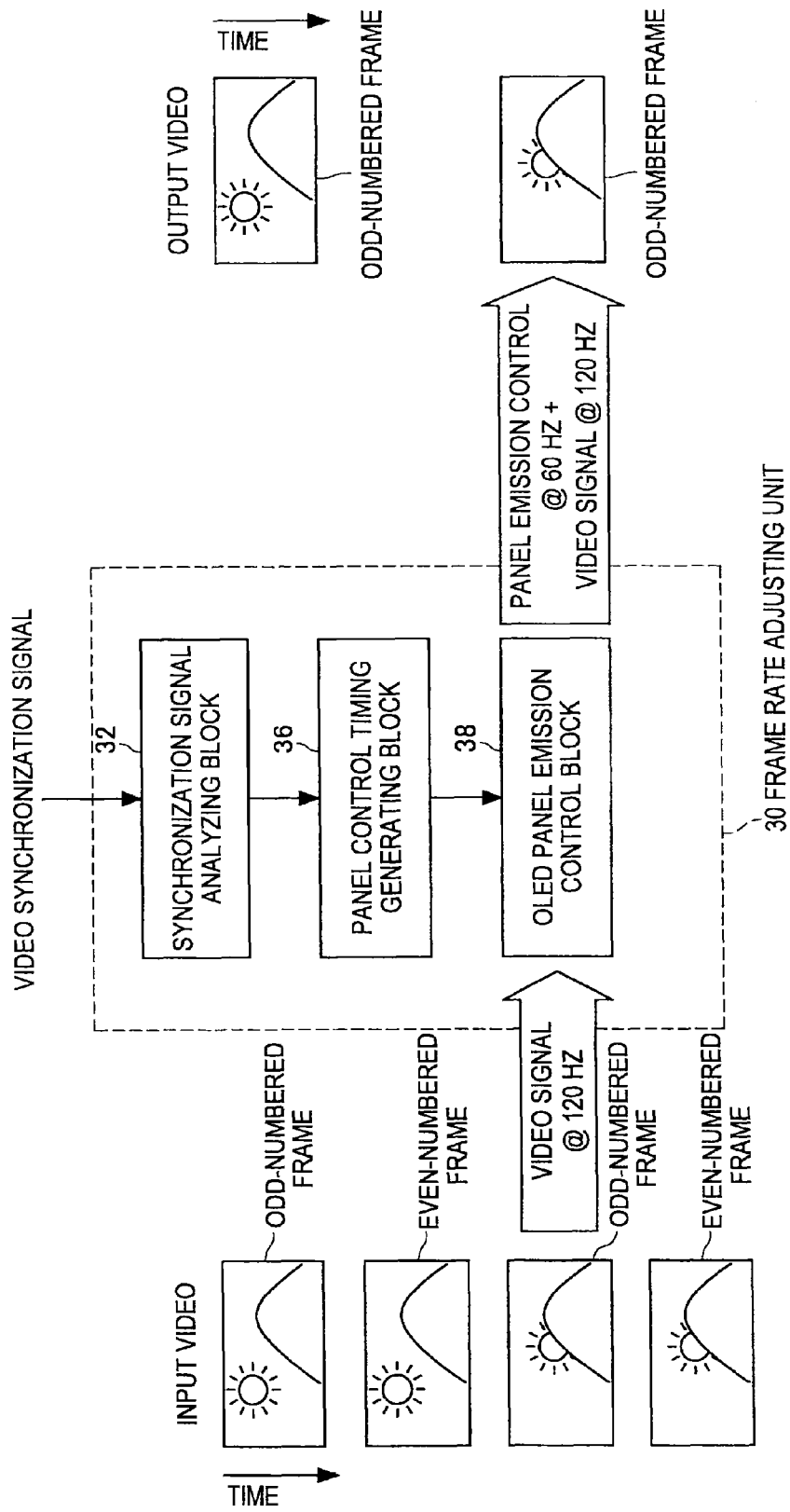

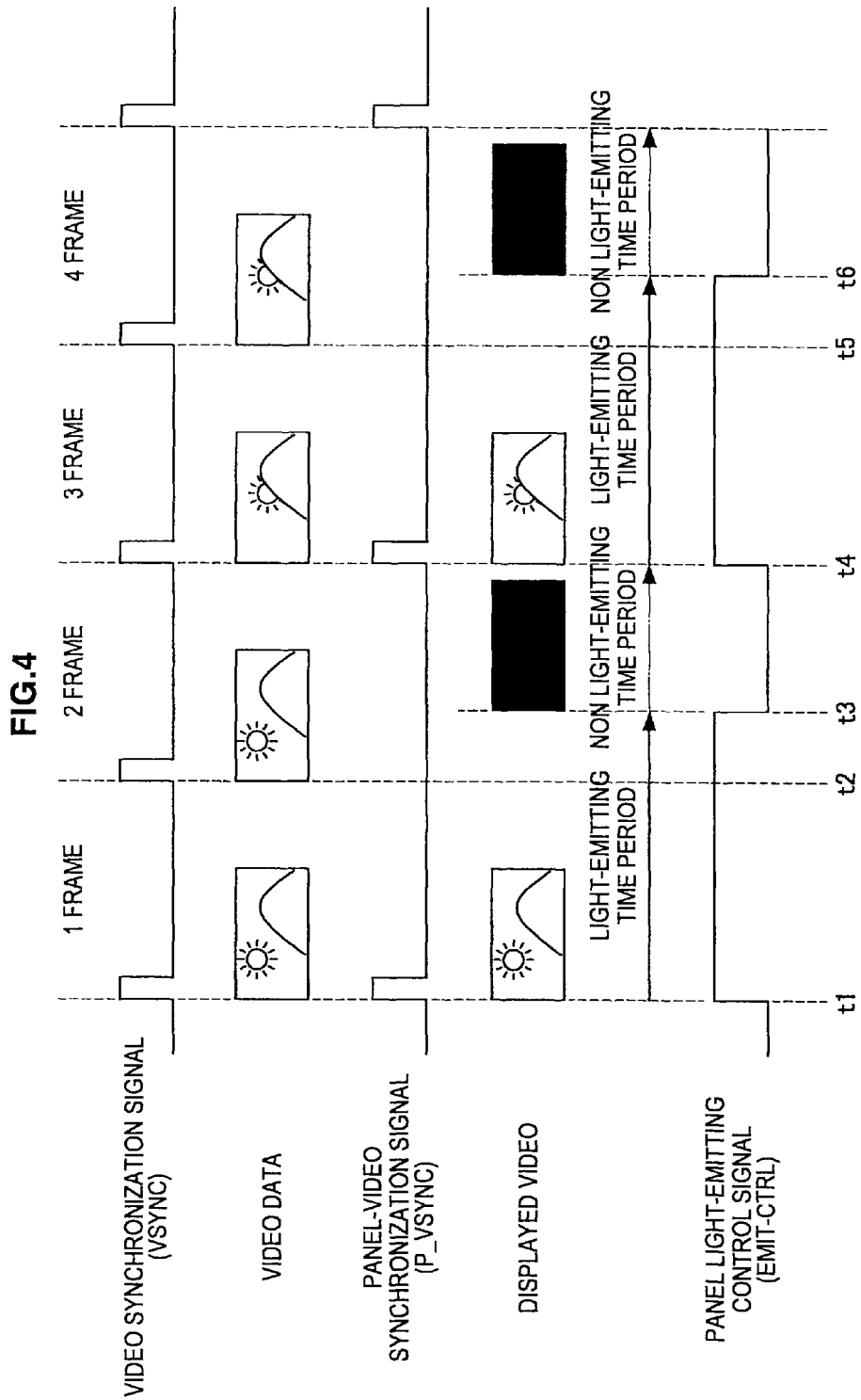

IMAGE DISPLAY DEVICE, IMAGE DISPLAY METHOD, AND PROGRAM

CROSS-REFERENCE TO RELATED APPLICATIONS

This application is a continuation of U.S. Ser. No. 13/256,972, filed Sep. 16, 2011, which is a National Stage of PCT/JP2010/059250, filed Jun. 1, 2010 and claims the benefit of priority under 35 U.S.C. §119 of Japanese Application No. 2009-143726, filed Jun. 16, 2009. The entire contents of which are incorporation herein by reference.

TECHNICAL FIELD

The present invention relates to an image display device, an image display method, and a program.

BACKGROUND ART

In recent years, a technique of increasing a video signal of typically 60 Hz or the like to a high frame rate (120 Hz, 240 Hz, or the like) in order to increase moving picture responsiveness has been known. In a high frame rate video, compared to a video of typically 60 frames (60 Hz), more frames are displayed, and thus a user can enjoy a very smooth video.

SUMMARY OF INVENTION

Technical Problem

However, in a device that performs high frame rate display, a user may desire display of a normal frame rate. In this case, if a normal frame rate is restored by a technique such as frame doubling of continuously displaying the same frame without changing a frame rate, the same video is continuously displayed, and thus there is a problem in that a video deteriorates. Particularly, for example, at the time of displaying a moving picture, if the same video is continuously displayed, a viewer estimates the position next to a moving object and moves a sight line, but the moving picture stops at the same position. Thus, there arises a problem in that the video is doubly recognized by the viewer.

This problem is considered to prominently occur, particularly, in a self-emission type device such as an organic electroluminescence (EL) display panel that is relatively fast in response speed of video display.

The present invention is made in light of the above problems, and it is an object of the present invention to provide an image display device, an image display method, and a program, which are novel and improved and which are capable of reliably preventing deterioration of a video caused since the video is continuously displayed for each frame.

Solution to Problem

In order to solve the above problems, according to an aspect of the present invention, there is provided an image display device, including a high frame rate signal generating unit that increases a frame rate of an input video signal, a frame rate adjusting unit that adjusts a frame rate by setting a non-emission frame at a predetermined cycle on a high frame rate video signal output from the high frame rate signal generating unit, and a display panel that displays a video based on a video signal output from the frame rate adjusting unit.

Further, the frame rate adjusting unit may include an emission control unit that extends an emission time of a frame directly before a frame set to non-emission up to a field of the frame set to non-emission.

Further, the frame rate adjusting unit may include a synchronization signal analyzing unit that analyzes a video synchronization signal of the high frame rate video signal generated by the high frame rate signal generating unit, and a control timing generating unit that deletes the video synchronization signal of a frame set to non-emission based on an analysis result of the video synchronization signal.

Further, in order to solve the above problems, according to another aspect of the present invention, there is provided an image display method, including increasing a frame rate of an input video signal, adjusting a frame rate by setting a non-emission frame at a predetermined cycle on a high frame rate video signal output from the high frame rate signal generating unit, and displaying a video based on a video signal output from the frame rate adjusting unit.

Further, in order to solve the above problems, according to another aspect of the present invention, there is provided a program causing a computer to function as a means for increasing a frame rate of an input video signal, a means for adjusting a frame rate by setting a non-emission frame at a predetermined cycle on a high frame rate video signal output from the high frame rate signal generating unit, and a means for displaying a video based on a video signal output from the frame rate adjusting unit.

Advantageous Effects of Invention

According to the present invention, it is possible to reliably prevent deterioration of a video caused by continuous display of each frame of the video.

BRIEF DESCRIPTION OF DRAWINGS

FIG. 1 is a schematic diagram illustrating a schematic configuration of an image display device according to an embodiment of the present invention.

FIG. 2 is a diagram schematically illustrating a video of each frame using a vertical axis as a time axis.

FIG. 3 is a schematic diagram illustrating a configuration of a frame rate adjusting unit.

FIG. 4 is a timing chart representing various signals and data related to an operation of an image display device.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, a description will be made in the following order.
(1) Background Technology
(2) Configuration Example of Image Display Device
(3) Configuration Example of Frame Rate Adjusting Unit
(1) Background Technology In order to increase moving picture responsiveness, a high frame rate technique for increasing a video signal of 60 Hz to 120 Hz or 240 Hz has been rapidly spreading. For this reason, an image display device such as a television receiver includes an integrated circuit (IC) (a high frame rate IC) that performs frame creating on a video signal of 60 Hz and generates a video signal of a high frame rate.

In a high frame rate video, compared to a video of typically 60 frames (60 Hz), more frames are displayed, and thus a user can enjoy a very smooth video. Meanwhile, a video of a high frame rate is generated originally from a video signal of 60 Hz, and a video that has not originally been present is created between videos of 60 frames. For this reason, the quality of the video may deteriorate. Further, in a video of a high frame rate, when a video such as a movie is enjoyed, the video may lose its original taste since the video becomes too smooth. For this reason, for example, a television receiver having a video display function of a high frame rate generally has a mode for turning off the function.

In the case of turning off the video display function of the high frame rate, the off function is implemented such that a typical high frame rate IC does not lower a frame rate to 60 Hz but performs frame doubling to output in a state in which a high frame rate is maintained. In this case, the same video is continuously displayed twice.

In a hold-type display that is slow in response speed like an LCD, frame doubling is effective. However, in a self-emission type organic EL display, since a response speed is very fast, when a frame-doubled video is displayed, there arises an adverse effect that the video is doubly viewed.

(2) Configuration Example of Image Display Device

In this regard, in the present embodiment, provided is a technique of restoring a doubled video signal to a normal frame rate and displaying a video of a normal frame rate. First, a schematic configuration of an image display device 10 according to the present invention will be described with reference to FIG. 1. As illustrated in FIG. 1, the image display device 10 includes a high frame rate signal generating unit 20, a frame rate adjusting unit 30, and a display panel 40.

FIG. 2 schematically illustrates a video of each frame using a vertical axis as a time axis. In FIG. 2, a video by an input signal (60 Hz) to the high frame rate signal generating unit 20, a video by an output signal (120 Hz) from the high frame rate signal generating unit 20, and a video by an output signal (120 Hz) from the frame rate adjusting unit 30 are schematically illustrated in order from the left side.

A video signal of 60 Hz such as a television signal is input to the high frame rate signal generating unit 20. The high frame rate signal generating unit 20 performs doubling on the video signal of 60 Hz and generates a high frame rate video signal of 120 Hz. As illustrated in FIG. 2, the high frame rate signal generating unit 20 generates (doubles) a signal corresponding to two videos from a signal corresponding to one video. As a result, a high frame rate video signal in which the number of frames per unit time is doubled is generated. The frequency of a high frame rate is not limited thereto.

The frame rate adjusting unit 30 performs a process of adjusting the frame rate of a high frame rate video signal of 120 Hz generated by the high frame rate signal generating unit 20 when the video display function of the high frame rate is turned off. In the present embodiment, as described in detail later, signals are to be adjusted so that every other frame is non-emission with respect to the high frame rate video signal of 120 Hz.

The display panel 40 is configured with a display panel such as an organic EL (OLED) display panel and includes pixels that are arranged in a matrix form to perform emission display. The display panel 40 receives a signal output from the frame rate adjusting unit 30 and causes the pixels to emit light based on the input signal.

(3) Configuration Example of Frame Rate Adjusting Unit

FIG. 3 is a schematic diagram illustrating a configuration of the frame rate adjusting unit 30. In addition, FIG. 4 is a timing chart illustrating an operation of the image display device 10.

As shown in FIG. 3, the frame rate adjusting unit 30 includes a synchronization signal analyzing block 32, a panel control timing generating block 36, and a OLED panel emission control block 38.

The components illustrated in FIGS. 1 to 3 may be configured with hardware (circuit) such as a high frame rate IC or a central processor such as a central processing unit (CPU) and a program (software) operating the hardware and the central processor. When the components illustrated in FIG. 1 are configured with the central processor and the program operating the central processor, the program may be stored in a memory or the like included in the image display device. Further, processing of an image display method according to the present embodiment is implemented by a processing procedure sequentially performed by the components illustrated in FIGS. 1 to 3.

FIG. 4 is a timing chart illustrating various signals and data related to an operation of the image processing device 10. A "video synchronization signal Vsync" illustrated in FIG. 4 is generated according to display timing of each frame when the video signal of the high frame rate is generated by the high frame rate signal generating unit 20. "Video data" illustrated in FIG. 4 is data of a video corresponding to the video signal of the high frame rate output from the high frame rate signal generating unit 20. A "panel-video synchronization signal P_Vsync" illustrated in FIG. 4 is a video synchronization signal in which the video synchronization signal of the even-numbered frame is deleted by the panel control timing generating block 36 which will be described later. A "video to display" illustrated in FIG. 4 is a video to be actually displayed on the display panel 40. A "panel emission control signal Emit-Ctrl" illustrated in FIG. 4 represents a signal for controlling an emission time of a frame to be displayed on the display panel 40.

Referring to FIG. 3, the video signal of the high frame rate from the high frame rate signal generating unit 20 is input to the OLED panel emission control block 38. The video synchronization signal (signal for acquiring synchronization of frames) from the high frame rate signal generating unit 20 is input to the synchronization signal analyzing block 32. One pulse of the video synchronization signal is regarded as a pulse representing the start of a predetermined one frame. The frequency of the video synchronization signal is 120 Hz which is twice the normal frequency (a normal frame rate of 60 Hz). Thus, the pulse representing the start of the same frame is continuously output twice during 60 Hz that is the normal frame rate.

The synchronization signal analyzing block 32 analyzes whether or not a current frame is a frame to which a non-emission time period is set based on the video synchronization signal input from the high frame rate signal generating unit 20. In the present embodiment, as illustrated in FIG. 4, the non-emission time period is set to the even-numbered frame. For this reason, the synchronization signal analyzing block 32 analyzes whether the current frame is the even-numbered frame or the odd-numbered frame based on the video synchronization signal and outputs an analysis result to the panel control timing generating block 36.

The panel control timing generating block 36 performs a process of deleting the video synchronization signal Vsync on a frame to which the non-emission time period is set based on the analysis result of the synchronization signal analyzing block 32. Here, since the non-emission time period is set to the even-numbered frame, as illustrated in FIG. 4, when the current frame is the even-numbered frame, the video synchronization signal Vsync of the even-numbered frame is erased. As a result, the panel-video synchronization signal P_Vsync illustrated in FIG. 4 can be obtained. Since the panel-video synchronization signal P_Vsync is a signal representing timing for displaying the video of the corresponding frame on the display panel 40, by deleting the synchronization signal of the even-numbered frame, the video of the even-numbered frame is not displayed. Thus, the even-numbered frame becomes the non-emission time period.

The OLED panel emission control block 38 decides an emission time period of the odd-numbered frame. The emission time period of the odd-numbered frame is a section in which the panel emission control signal Emit-Ctrl illustrated in FIG. 4 is high, and the OLED panel emission control block 38 decides a duty ratio of the panel emission control signal Emit-Ctrl.

In the present embodiment, the OLED panel emission control block 38 sets a duty ratio of the panel emission control signal Emit-Ctrl so that the emission time period of the odd-numbered frame can overlap the field of the emission time period of the original even-numbered frame. In further detail, in a state in which the video synchronization signal is not deleted, emission of the even-numbered frame starts at timing (t2 and t5 illustrated in FIG. 4) at which the video synchronization signal transitions to high, but the termination of the emission time period of the odd-numbered frame is set to timing after the times t2 and t5 have elapsed. As described above, the emission time period of the odd-numbered frame extends up to the field of the emission time period of the even-numbered frame in which the video synchronization signal is not deleted.

As a result, the OLED panel emission control block 38 outputs the video signal (120 Hz) in the state in which the video synchronization signal of the even-numbered frame is deleted (according to the panel-video synchronization signal P_Vsync illustrated in FIG. 4) and outputs the panel emission control signal Emit-Ctrl. As described above, since the video signal is 120 Hz but the video synchronization signal Vsync of the even-numbered frame has been deleted, the video by the video signal of the even-numbered frame is not displayed on the display panel 40. Since the panel emission control signal Emit-Ctrl controls the emission time period of the video of the odd-numbered frame as illustrated in FIG. 4, a cycle thereof is 60 Hz.

As described above, in the present embodiment, since the video synchronization signal of the even-numbered frame has been deleted, the video of the even-numbered frame is set to non-emission and is not displayed on the display panel 40. Thus, compared to the off function of high frame rate video display by frame doubling, particularly even in an organic EL display having a fast response speed, a phenomenon that the video is doubly viewed does not occur. Accordingly, when the high frame rate video display function is turned off, an excellent video having no deterioration can be displayed.

Furthermore, in the present embodiment, as illustrated in FIG. 4, the emission time of the odd-numbered frame extends up to the field of the even-numbered frame that is not displayed. Thus, even when the even-numbered frame is not displayed, a decrease in brightness can be reliably compensated.

The extension of the emission time of the frame, for example, a time between t2 and t3, is about 40% of the time period (between t2 and t4) of the field of the even-numbered frame as illustrated in FIG. 4. Thus, the odd-numbered frame emits light during 40% of the time period (between t2 and t4) of the field of the even-numbered frame, and a decrease in brightness can be reliably suppressed.

Further, the termination of the emission time period of the odd-numbered frame may be set to a time before the start time t2 or t5 of the field of the even-numbered frame. Even in this case, since the termination of the emission time period is close to the times t2 and t5, the emission time period can be longer than the normal emission time period of the odd-numbered frame, deterioration of the video can be suppressed, and a decrease in brightness can be suppressed.

As described above, according to the present embodiment, when the video display function of the high frame rate is turned off, by setting the frame in which the video is not displayed, the off function of the high frame rate can be implemented without deteriorating the video. Further, by extending the emission time of the frame in which the video is displayed up to the section of the frame in which the video is not displayed, it is possible to reliably compensate a decrease in brightness caused by setting the frame in which the video is not displayed.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 10 image display device
20 high frame rate signal generating unit
30 frame rate adjusting unit
32 synchronization signal analyzing block
36 panel control timing generating block
38 OLED panel emission control block
40 display panel

The invention claimed is:

1. An image display device, comprising:
   circuitry configured to
      generate a 120 Hz frame rate video signal by increasing a frame rate of a 60 Hz frame rate input video signal by performing frame doubling on the 60 Hz frame rate input video signal;
      set a non-emission frame at a predetermined cycle on the 120 Hz frame rate video signal;
      analyze a video synchronization signal of the 120 Hz frame rate video signal;
      delete a video synchronization signal of a frame set to non-emission based on a result of the analyzing;
      extend an emission time of a frame directly before the frame set to non-emission into less than a full length of a field of the frame set to non-emission without changing a frame rate of the 120 Hz frame rate video signal; and
      control a display panel to display a video based on the setting, the analyzing, the deleting, and the extending.

2. The image display device of claim 1, wherein
   the circuitry is configured to extend the emission time of the frame directly before the frame set to non-emission into less than 50% the length of the field of the frame set to non-emission.

3. The image display device of claim 2, wherein
the circuitry is configured to extend the emission time of the frame directly before the frame set to non-emission into 40% of the length of the field of the frame set to non-emission.

4. The image display device of claim 1, further comprising:
the display panel, wherein the display panel is an organic electroluminescence (EL) display panel.

5. The image display device of claim 1, wherein
the circuitry is configured to extend an emission time of a frame directly after a frame set to non-emission into a portion of a field of a preceding frame set to non-emission.

6. A method comprising:
generating a 120 Hz frame rate video signal by increasing a frame rate of a 60 HZ frame rate input video signal by performing frame doubling on the 60 Hz frame rate input video signal;
setting a non-emission frame at a predetermined cycle on the 120 Hz frame rate video signal;
analyzing a video synchronization signal of the 120 Hz frame rate video signal;
deleting a video synchronization signal of a frame set to non-emission based on a result of the analyzing;
extending an emission time of a frame directly before the frame set to non-emission into less than a full length of a field of the frame set to non-emission without changing a frame rate of the 120 Hz frame rate video signal; and
controlling a display panel to display a video based on the setting, the analyzing, the deleting, and the extending.

7. A non-transitory computer-readable medium including computer program instructions, which when executed by an image display device, causes the image display device to:
generate a 120 Hz frame rate video signal by increasing a frame rate of a 60 HZ frame rate input video signal by performing frame doubling on the 60 Hz frame rate input video signal;
set a non-emission frame at a predetermined cycle on the 120 Hz frame rate video signal;
analyze a video synchronization signal of the 120 Hz frame rate video signal;
delete a video synchronization signal of a frame set to non-emission based on a result of the analyzing;
extend an emission time of a frame directly before the frame set to non-emission into less than a full length of a field of the frame set to non-emission without changing a frame rate of the 120 Hz frame rate video signal; and
control a display panel to display a video based on the setting, the analyzing, the deleting, and the extending.

* * * * *